US012608757B2

(12) United States Patent
Sima et al.

(10) Patent No.: US 12,608,757 B2
(45) Date of Patent: Apr. 21, 2026

(54) REAL-TIME INTERACTIVE VIDEO GENERATION METHOD AND SYSTEM

(71) Applicant: NANJING SILICON INTELLIGENCE TECHNOLOGY CO., LTD., Nanjing (CN)

(72) Inventors: Huapeng Sima, Nanjing (CN); Hao Jiang, Nanjing (CN)

(73) Assignee: NANJING SILICON INTELLIGENCE TECHNOLOGY CO., LTD., Nanjing (CN)

( * ) Notice: Subject to any disclaimer, the term of this patent is extended or adjusted under 35 U.S.C. 154(b) by 0 days.

(21) Appl. No.: 19/069,267

(22) Filed: Mar. 4, 2025

(65) Prior Publication Data

US 2026/0017754 A1 Jan. 15, 2026

(30) Foreign Application Priority Data

Jul. 15, 2024 (CN) ........................ 202410939073.0

(51) Int. Cl.
*G06T 3/4046* (2024.01)
*G06T 3/4053* (2024.01)
(Continued)

(52) U.S. Cl.
CPC .......... *G06T 3/4046* (2013.01); *G06T 3/4053* (2013.01); *G06T 5/60* (2024.01);
(Continued)

(58) Field of Classification Search
None
See application file for complete search history.

(56) References Cited

FOREIGN PATENT DOCUMENTS

| | | |
|---|---|---|
| CN | 112991183 A | 6/2021 |
| CN | 117135331 A | 11/2023 |

(Continued)

OTHER PUBLICATIONS

Lan et al: Siamese Network with Interactive Transformer for Video Object Segmentation. The Thirty-Sixth AAAI Conference on Artificial Intelligence, Dec. 28, 2021.

(Continued)

*Primary Examiner* — Aaron M Richer
(74) *Attorney, Agent, or Firm* — Laine IP Oy

(57) ABSTRACT

The present application provides a real-time interactive video generation method and system, relates to the field of deep learning technology, including acquiring training data including interactive information and video data corresponding to the interactive information; preprocessing the training data to obtain target training data; performing model training including a model pre-training process and a video pre-generation process based on the target training data, wherein the model pre-training process includes a training of a low-resolution image reconstruction model and a training of a super-resolution model, and the video pre-generation process includes performing a pre-generation of a video based on an interactive video generation model to complete a training of the interactive video generation model, the trained interactive video generation model having the low-resolution image reconstruction model and the super-resolution model, the trainings of which have been completed; and generating an interactive video by using the trained interactive video generation model.

8 Claims, 3 Drawing Sheets

(51) Int. Cl.
*G06T 5/60* (2024.01)
*G06T 5/70* (2024.01)
*G06T 13/20* (2011.01)

(52) U.S. Cl.
CPC ................ *G06T 5/70* (2024.01); *G06T 13/20* (2013.01); *G06T 2207/10016* (2013.01); *G06T 2207/20081* (2013.01); *G06T 2207/20084* (2013.01); *G06T 2207/20221* (2013.01)

(56) References Cited

FOREIGN PATENT DOCUMENTS

| | | | | | |
|---|---|---|---|---|---|
| CN | 117478978 | A | | 1/2024 | |
| WO | WO-2021159781 | A1 | * | 8/2021 | ........... G06F 18/213 |
| WO | WO2023221684 | A1 | | 11/2023 | |
| WO | WO2024109308 | A1 | | 5/2024 | |
| WO | WO-2024120224 | A1 | * | 6/2024 | ............... G06N 3/08 |
| WO | WO-2025128665 | A1 | * | 6/2025 | ............. G06N 3/044 |

OTHER PUBLICATIONS

Notification of grant of patent right for invention for Chinese patent application 202410939073.0 dated Aug. 29, 2024.
Notification of the first office action for Chinese patent application 202410939073.0 dated Aug. 20, 2024.

* cited by examiner

S100 — acquiring training data comprising interactive information and video data corresponding to the interactive information S200 — preprocessing the training data to obtain target training data S300 — performing model training comprising a model pre-training process and a video pre-generation process based on the target training data, the model pre-training process comprising a training of a low-resolution image reconstruction model and a training of a super-resolution model, and the video pre-generation process comprising performing a pre-generation of a video based on an interactive video generation model to complete a training of the interactive video generation model, the trained interactive video generation model having the low-resolution image reconstruction model and the super-resolution model, the trainings of which have been completed S400 — generating an interactive video by using the trained interactive video generation model

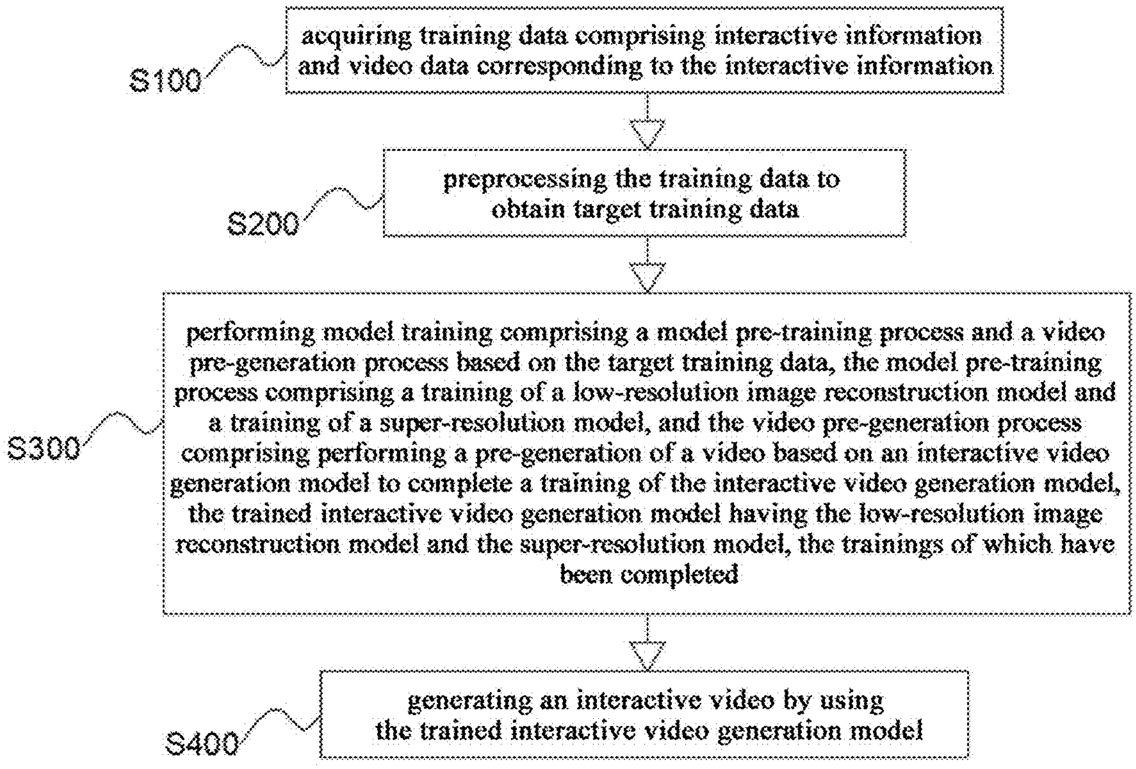

FIG. 1

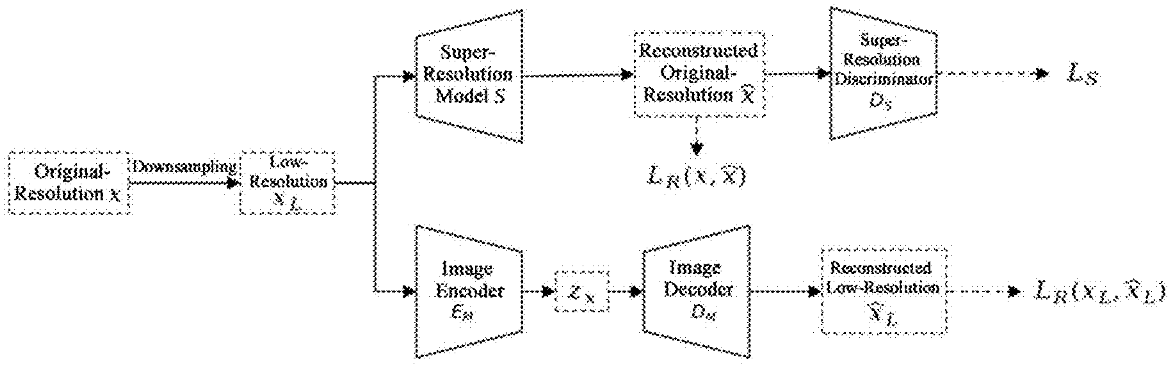

FIG. 2

REAL-TIME INTERACTIVE VIDEO GENERATION METHOD AND SYSTEM

FIELD OF THE INVENTION

The present disclosure relates to the field of deep learning technology, and particularly relates to a real-time interactive video generation method and system.

BACKGROUND OF THE INVENTION

With the rapid development of information technology, video generation and processing technology has become a major research hotspot in contemporary science and technology. Among many video processing techniques, the interactive video generation method is particularly noteworthy. This method can not only realize the basic functions of traditional video production, but also give users the ability to interact with the video content in real time, which greatly enriches the scenarios and possibilities of video applications.

In the current research, video generation techniques include mainly the following two kinds of schemes, Scheme 1 of which is to obtain a video image corresponding to text information through generating a frame of video based on the text information through a neural network by importing the text information into the neural network, and getting each of following frames in the same manner; and Scheme 2 of which is to obtain a video image by acquiring a temporal noise and importing the temporal noise into a 3D generation model.

However, whether it is Scheme 1 or Scheme 2, the generated video content is fixed, i.e., each frame of image is pre-determined and may not be dynamically adjusted according to real-time interactive operations. In addition, most of the prior techniques provide output in the form of video files, which may not implement the generation of real-time video streams, which is particularly insufficient in the scenarios that require immediate feedback and high interactivity.

SUMMARY OF THE INVENTION

The present application provides a real-time interactive video generation method and system to solve a problem that prior video generation techniques may not be adjusted interactively in real time.

In a first aspect, the present application provides a real-time interactive video generation method comprising:

acquiring training data comprising interactive information and video data corresponding to the interactive information;

preprocessing the training data to obtain target training data;

performing model training comprising a model pre-training process and a video pre-generation process based on the target training data, wherein the model pre-training process comprises a training of a low-resolution image reconstruction model and a training of a super-resolution model, and the video pre-generation process comprises performing a pre-generation of a video based on an interactive video generation model to complete a training of the interactive video generation model, the trained interactive video generation model having the low-resolution image reconstruction model and the super-resolution model, the trainings of which have been completed; and generating an interactive video by using the trained interactive video generation model.

Preferably, the preprocessing the training data comprises:

downsampling the video data to obtain low-resolution images, wherein a ratio of the downsampling for reducing resolution is determined according to a size of a frame image of the video data;

cropping the low-resolution images to obtain several groups of video segments, each of the video segments comprising T number of frames, and between adjacent two of the video segments being an interval of 2/T number of frames and being an overlap of 2/T number of frames; and recording corresponding interactive information for each of the video segments to obtain the target training data, a frame rate of the interactive information recorded for each of the video segments is not less than a number of frames of the corresponding video segment, and is an integer times of the number of the frames of the corresponding video segment.

Preferably, the recording corresponding interactive information for each of the video segments comprises performing Gaussian smoothing on the corresponding interactive information recorded in the video segment in a temporal dimension.

Preferably, the video pre-generation process further comprises:

generating an image latent feature corresponding to an initial frame of the low-resolution images;

inputting the image latent feature and interactive information of the corresponding low-resolution image into a transformer of the interactive video generation model to generate a target latent feature corresponding to a first frame image;

performing image reconstruction on the target latent feature to obtain a reconstructed low-resolution image; and performing super-resolution processing on the reconstructed low-resolution image to obtain a pre-generated first frame image corresponding to a pre-generated video, and thereby generating each of frame images corresponding to the pre-generated video, a resolution of the pre-generated first frame image being the same as a resolution of the video data.

Preferably, the generating an image latent feature corresponding to an initial frame of the low-resolution images comprises a first method and a second method;

the first method comprises acquiring latent features of all of the images in a process of training the low-resolution image reconstruction model, and selecting any one feature among all of the latent features as the image latent feature; and the second method comprises, after the training of the low-resolution image reconstruction model is completed, sampling from a priori distribution of all of the latent features to obtain the image latent feature.

Preferably, the video pre-generation process further comprises:

inputting the target latent feature into an image reconstruction decoder, and performing image reconstruction on the target latent feature through the image reconstruction decoder to obtain the reconstructed low-resolution image, where the image reconstruction decoder is a decoder of the low-resolution image reconstruction model, the training of which is completed; and inputting the reconstructed low-resolution image into the super-resolution model, the training of which has been completed, and performing the super-resolution processing on the reconstructed low-resolution image through the super-resolution model to obtain the each of the frame images corresponding to the pre-generated video with the same resolution as the video data.

Preferably, the video pre-generation process further comprises:

when generating a pre-generated $t^{th}$ frame image, inputting a $(t-1)^{th}$ image frame into the image reconstruction encoder to obtain an image latent feature of the $(t-1)^{th}$ image frame;

acquiring interactive information corresponding to the $(t-1)^{th}$ image frame and inputting the image latent feature and the interactive information corresponding to the $(t-1)^{th}$ image frame into the transformer of the interactive video generation model to obtain a target latent feature corresponding to the $(t-1)^{th}$ image frame;

inputting the target latent feature corresponding to the $(t-1)^{th}$ image frame into an image reconstruction decoder, and performing image reconstruction on the target latent feature of the $(t-1)^{th}$ image frame through the image reconstruction decoder to obtain a reconstructed low-resolution image corresponding to the $(t-1)^{th}$ image frame; and inputting the reconstructed low-resolution image corresponding to the $(t-1)^{th}$ image frame into the super-resolution model, the training of which has been completed, and performing the super-resolution processing on the reconstructed low-resolution image corresponding to the $(t-1)^{th}$ image frame through the super-resolution model to obtain a pre-generated $(t-1)^{th}$ image frame.

Preferably, the transformer comprises an interactive information encoder, a transformer encoder and a transformer decoder, and the video pre-generation process further comprises:

inputting the interactive information of the corresponding low-resolution image into the interactive information encoder to obtain an interactive latent feature of the interactive information of the corresponding low-resolution image; and inputting the image latent feature into the transformer decoder, into which the interactive latent feature is transmitted through the transformer encoder, and generating the target latent feature of a corresponding image frame based on the interactive latent feature and the image latent feature through the transformer decoder.

Preferably, the video pre-generation process further comprises:

merging all of the generated image frames into the pre-generated video;

calculating a reconstruction loss function of the pre-generated video and a real video corresponding to the video data, the reconstruction loss function including MAE loss, MSE loss, perceptual loss and image similarity loss;

constructing a cross-entropy loss function for adjusting the parameters of a video discriminator, the video discriminator being a component in the interactive video generation model for adjusting a definition of the pre-generated video to gradually approach that of the real video; and performing parameter adjustments of respective ones of components in the interactive video generation model by the reconstruction loss function and the cross-entropy loss function.

Preferably, the performing parameter adjustments of respective ones of components in the interactive video generation model by the reconstruction loss function and the cross-entropy loss function comprises calculating a gradient for the parameters of the respective ones of components in the interactive video generation model by the reconstruction loss function and adjusting the parameters of the respective ones of components in the interactive video generation model by means of gradient descent.

In a second aspect, the present application further provides a real-time interactive video generation system comprising:

a data acquisition module configured to acquire training data comprising interactive information and video data corresponding to the interactive information;

a data preprocessing module configured to preprocess the training data to obtain target training data;

a model training module configured to perform model training including a model pre-training process and a video pre-generation process based on the target training data, wherein the model pre-training process includes a training of a low-resolution image reconstruction model and a training of a super-resolution model, and the video pre-generation process includes performing a pre-generation of a video based on an interactive video generation model to complete the training of the interactive video generation model, the trained interactive video generation model having the low-resolution image reconstruction model and the super-resolution model, the trainings of which have been completed; and a video generation module comprising the trained interactive video generation model including the resolution image reconstruction model and the super-resolution model, the trainings of which have been completed, wherein the video generation module is configured to perform the generation of an interactive video by using the trained interactive video generation model.

As may be seen from the foregoing, the present application provides a real-time interactive video generation method comprising acquiring training data comprising interactive information and video data corresponding to the interactive information; preprocessing the training data to obtain target training data; performing model training comprising a model pre-training process and a video pre-generation process based on the target training data, wherein the model pre-training process includes a training of a low-resolution image reconstruction model and a training of a super-resolution model, and the video pre-generation process includes performing a pre-generation of a video based on an interactive video generation model to complete a training of the interactive video generation model, the trained interactive video generation model having the low-resolution image reconstruction model and the super-resolution model, the trainings of which have been completed; and generating an interactive video by using the trained interactive video generation model. A problem that prior video generation techniques may not perform real-time interaction may be solved by the method.

BRIEF DESCRIPTION OF THE DRAWINGS

In order to describe the technical solutions of the present application to be clearer, the accompanying drawings for the embodiments will be briefly described below, and it will be obvious to a person of ordinary skill in the art that other accompanying drawings may be derivable based on these drawings without creative labor.

FIG. 1 shows a flowchart illustrating a real-time interactive video generation method of the present application;

FIG. 2 shows a schematic diagram illustrating data processing for training a low-resolution image reconstruction model and a super-resolution model in a real-time interactive video generation method of the present application;

DETAILED DESCRIPTION OF THE EMBODIMENTS

Figure 3:
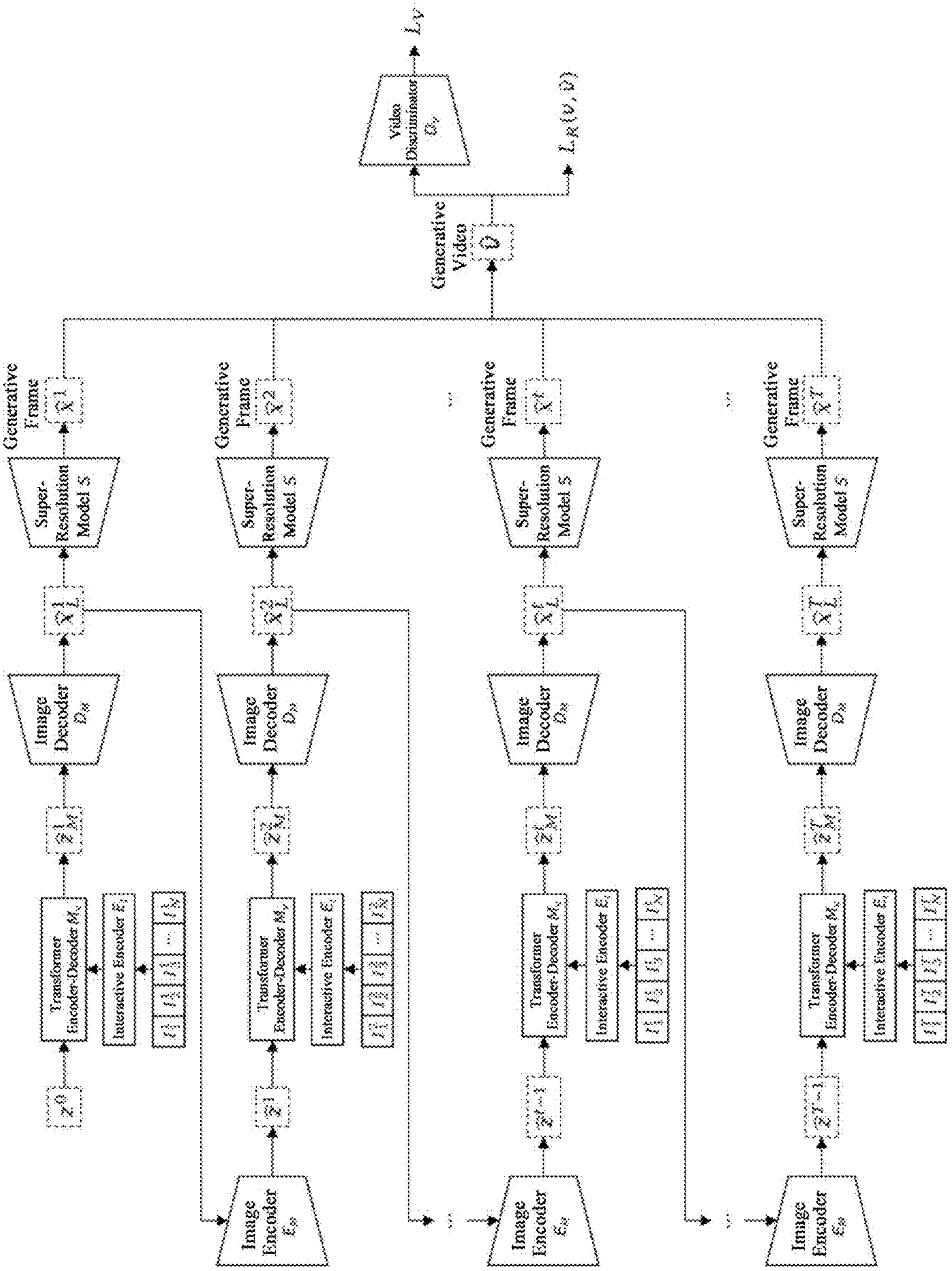
FIG. 3 shows a schematic diagram illustrating data processing for training an interactive video generation model in a real-time interactive video generation method of the present application.

The technical solutions in the embodiments of the present disclosure will be clearly and completely described below in conjunction with the accompanying drawings in the embodiments of the present disclosure, and it is clear that the described embodiments are only a part, not all, of embodiments of the present invention. Based on the embodiments in the present disclosure, all of other embodiments derivable by a person of ordinary skill in the art without making creative labor fall within the scope of protection of the present invention.

In a particular interactive scene, the acquired continuous interactive operation is used for the generation of a continuous video screen, where the generated video screen contains content matched with the interactive operation. The above interactive scenarios include, but are not limited to, scenarios such as clicking by a keyboard or a mouse, operating by a gamepad, voice control, motion capture by a somatosensory device, motion capture by a photographic device, or a brain-computer interface. The above video screen and content are generated by the above interaction, the change of which occurs following the change of the above interaction, including but not limited to video content such as game screen, scene guide, and the like.

For example, in a certain game, keyboard arrow keys are used to provide operations, where the game screen generates corresponding images as keyboard inputs change; continuous keyboard inputs and corresponding image content are captured to train an interactive video generation model; continuous keyboard interactions are fed into the interactive video generation model to generate continuous image content, i.e., video content, which is related to a specific scene, that is, a certain interactive video generation model may generate video content for a specific scene. If it is needed to generate video content for a new scene, it is needed to re-collect data and train a new interactive video generation model.

At present prior techniques of generating video include:

In a first scheme, a prior video generation process includes steps (1) inputting text information into a Decoder model of a Transformer neural network, encoding the text information, and generating an encoding feature of a corresponding frame image; (2) decoding the encoding feature of the frame image into a current frame image using the Decoder model of a VQVAE neural network; (3) downsampling and inputting the generated current frame image into the Encoder model of VQVAE neural network to obtain the encoding information of the generated image; (4) inputting the text information and the encoding information of the generated image into the Decoder model of the Transformer neural network to obtain an encoding feature of a corresponding image of a next frame image; and (5) repeating the steps (2) to (4) until a preset number of frames are reached to output a complete video.

In a second scheme, a process of generating the video includes: steps (1) randomly sampling a timing noise, inputting the timing noise into a 3D generator model similar to structures of StyleGAN2 and StyleGAN3 through a mapping network, and up-sampling an initial input from the temporal and spatial dimensions, respectively, by the 3D generator model, to generate a low-resolution video; and (2) inputting the low-resolution video generated from step (1) into a video super-resolution model to obtain a generated video with a high-resolution generative video.

In a third scheme, a video generation is performed by using textual information as a condition, or an unconditional video generation may also be performed. The third scheme for video generation uses a diffusion model with a backbone of 3D-UNet to sample noise from a standard Gaussian distribution for stepwise denoising and finally acquiring the generated video. In the stepwise denoising process, language models, such as pre-trained BERT, CLIP, etc., may be used to extract textual features from given textual information, and the textual features are injected into the 3D-UNet using the self-attention mechanism to provide textual condition guidance for video generation. Of course, it is also possible to perform the unconditional video generation without using textual information.

According to the above schemes, it may be known that: a first scheme is directed to a conditional video generation using textual information, a second scheme is directed to an unconditional video generation without using other information, and a third scheme is directed to a scheme in which both a conditional video generation using textual information and unconditional video generation without using other information may be performed. In the above method, when the textual information or an initial state is given, the content of the generated video is fixed, that is, each of frame images of the generated video is fixed. Each of the frame images of the generated video is related to only the initial input, and if the input changes during the generation process, that is, an interactive occurs, no process can be performed by the above method. Meanwhile, the output of the second and third schemes is in the form of a video, which is not capable of generating a real-time video stream.

Based on the foregoing, the present embodiments provide the following solutions to the above problems.

FIG. 1 shows a flowchart illustrating a real-time interactive video generation method of the present application.

Referring to FIG. 1, it may be seen that the present embodiment provides a real-time interactive video generation method comprising:

S100, acquiring training data comprising interactive information and video data corresponding to the interactive information. Specifically, in this embodiment, the training data is continuous interactive information and video data corresponding to the interaction. Here, the interactive information involves, but is not limited to, keyboard or mouse clicks, gamepad operation, voice control, motion capture by a somatosensory device, motion capture using a photographic device, a brain-computer interface, or the like. All of these interactive information is captured directly by some external device; or data is first captured by some external device, and then the interactive information is extracted from the captured data by relevant software or algorithms. The video data corresponding to the interactive refers to the video generated by the above process of the interaction, and changes in the above process of the interactive may correspond to changes in video content. Taking a racing game as an example, keyboard operation may control movements of objects in the game screen, and when the keyboard operation changes, content of the game screen will change accordingly.

When acquiring training data, it is needed to record both interactive operation information and video image data. A duration of the video for training is as long as possible, not less than 10 minutes, which is not limited thereto. A video resolution may be a common resolution, such as 360P, 480P, 720P, 1080P, etc., but not mandatory. Video frame rate may be a common video frame rate at present, such as 25 frames per second or 30 frames per second, not mandatory. Meanwhile, the interactive operation information synchronized with the video may be recorded, where the frame rate of the interactive operation information is not lower than the video frame rate, and is an integer times of the video frame rate. For example, if the recorded video frame rate is 30 fps, the frame rate of the recorded interactive operation information may be 30 fps, 60 fps, 90 fps, 120 fps and so on.

S200, preprocessing the training data to obtain target training data. Specifically, in this embodiment, in order to facilitate a subsequent model training, it is needed to first preprocess the training data, wherein the preprocessing the training data comprises:

downsampling the video data to obtain a low-resolution image, where a ratio of the downsampling for reducing resolution is determined according to a size of a frame image of the video data; cropping the low-resolution images to obtain several groups of video segments, each of the video segment comprising T number of frames, between adjacent two of the video segments being an interval of 2/T number of frames and being an overlap of 2/T number of frames; recording corresponding interactive information for each of the video segments to obtain the target training data, where a frame rate of the interactive information recorded for each of the video segments is not less than a number of frames of the corresponding video segment, and the frame rate of the interactive information recorded for each of the video segments is an integer times of the number of the frames of the corresponding video segment.

Exemplarily, in order to train an image reconstruction model and a super-resolution model S, it is needed to extract images of all the frames from the captured video, the frame images having the same resolution as that of the video, which is here denoted as an original-resolution x. A downsampling operation at a certain ratio is performed for the original-resolution x to obtain a low-resolution $x_L$. A certain downsampling ratio needs to be determined according to the size of the frame image. For example, if the video frame image is 360P or 480P, the downsampling ratio is 2, i.e., a length and width of the low resolution after the downsampling is $$\frac{1}{2}$$

of those of the original resolution. If the video frame image is 720P or 1080P, the downsampling ratio is 4, i.e., the length and width of the low resolution after the downsampling is $$\frac{1}{4}$$

of the length and width of the original resolution. The higher the resolution of the original image is, the higher the downsampling ratio is.

It should be noted that the low-resolution $x_L$ and the original-resolution x are in the form of images.

To train the interactive video generation model, the original video needs to be cropped into a number of segments each with an image portion denoted as v consisting of a set of frame images $[x^1, \ldots, x^t, \ldots, x^T]$, T being a number of frames contained in each video segment, and t being an index of the frame image in the video segment. When cropping a video into segments, each segment contains T number of frames and an interval between adjacent segments is $$\frac{T}{2}$$

number of frames, then between the adjacent segments is an overlap of $$\frac{T}{2}$$

number of frames. The corresponding interactive operation information to which the video segments v corresponds is $I=[I^1, \ldots, I^t, \ldots, I^T]$. Each frame image $x^t$ has its corresponding interactive operation $I^t$. Since the frame rate of the interactive operation information is not lower than the video frame rate, and is an integer times (denoted as N) of the video frame rate when recording data, then each frame of video images corresponds to a set of interactive operations $$I^t = [I_1^t, I_2^t, \ldots, I_n^t, \ldots, I_N^t],$$

where n is an index of the interactive operation information corresponding to the frame image $x^t$, and $$I_n^t$$

is an interactive information vector. Due to the diversity of interactive forms, the $$I_n^t$$

may be discrete or may also be continuous. For example, when the interactive information is collected from keyboard or mouse clicks, or gamepad operations, the interactive information is expressed as a discrete value from whether the key being clicked or not, and by this time $$I_n^t$$

is a set of one-hot coded vectors; and when the interactive information is collected from voice control, motion capture by a somatosensory device, motion capture by a photographic device, or a brain-computer interface, the interactive information is a set of continuous values. The f represents a number of features of the vector $$I_n^t,$$

then $I^t$ represents a f×N matrix. In order to unify the discrete interactive operation information and the continuous interactive operation information, in this embodiment, Gaussian smoothing is performed on $I^t$ in a temporal dimension (i.e. N) to transform the discrete interactive information into continuous interactive information, so as to realize that continuous interactive information may be obtained for training and inference in various interactive manners.

For certain more complex interactive manners, such as voice control, motion capture by a somatosensory device, motion capture by a photographic device, or a brain-computer interface, etc., raw data captured by itself may include acoustic signals, images, electrical signals, etc., a process of processing the raw data captured by each of the complex interactive manners is not included in a process of data preprocessing according to this embodiment. The information generated after the raw data is processed by the interactive manners themselves is used for the data preprocessing for the interactive operation information in this embodiment. For example, when using speech control as an interactive manner, acoustic signals does not be directly used in this embodiment, but are processed by some prior methods, and processed acoustic features are used as interactive operation information.

S300, performing model training comprising a model pre-training process and a video pre-generation process based on the target training data, the model pre-training process comprising a training of a low-resolution image reconstruction model and a training of a super-resolution model, and the video pre-generation process comprising performing a pre-generation of a video based on an interactive video generation model to complete a training of the interactive video generation model, the trained interactive video generation model having the low-resolution image reconstruction model and the super-resolution model, the trainings of which have been completed. Specifically, in this embodiment, step S300 is a step of model training, which is divided into two phases: (1) a pre-training process comprising the training of the low-resolution image reconstruction model, and the training of the super-resolution model S (2) the training of the interactive video generation model, through generating images frame by frame, the generated images may all be merged to generate a video or may also be outputted in real time into a video stream. There is no sequential requirement for the trainings of two models in the pre-training process. The pre-training process need be performed before the training of the interactive video generation model.

FIG. 2 shows a schematic diagram illustrating data processing for training a low-resolution image reconstruction model and a super-resolution model in a real-time interactive video generation method of the present application.

Referring to FIG. 2, it may be seen that the training of the low-resolution image reconstruction model includes the following scheme.

An image encoder $E_M$ and an image decoder $D_M$ are involved, consisting of basic neural network structures such as convolutional layer, fully connected layer, activation layer, pooling layer, and normalization layer. Some prior network structures may be used, for example, neural networks with encoder and decoder structures, such as AutoEncoder, VAE, and VQVAE; or it is also possible that an image reconstruction model is designed by using the basic structures. The specific structure of the neural network is not required here.

For the low-resolution image reconstruction model, a low-resolution $x_L$ is used as input, passes through an image encoder $E_M$ to obtain latent encoding $z_x$ of the input low-resolution $x_L$, and the latent encoding is then $z_x$ inputted into the image decoder $D_M$ to obtain a reconstructed low-resolution $\hat{x}_L$, where it is desired that the reconstructed image $\hat{x}_L$ is as close as possible to the input image $x_L$. The latent encoding $z_x$ generated by the image encoder $E_M$ in this process may be used to characterize the input image, which is subsequently used for the training and inference of an interactive video generation model.

To train the low-resolution image reconstruction model, a real low-resolution $x_L$ is used as input and also as supervised data, and passes through the image encoder $E_M$ and image decoder $D_M$, the reconstructed low-resolution $\hat{x}_L$ image is outputted from the model, and a reconstruction loss function $L_R(x_L, \hat{X}_L)$ is calculated. The reconstruction loss function is based on use of MAE loss ($L_1$ loss), MSE loss ($L_2$ loss), perceptual loss, image similarity loss, or any other loss function that may characterize an image difference. After the reconstruction loss function is calculated, a back propagation process is performed. Based on the calculated loss function, a gradient is calculated for parameters of each component of the image encoder $E_M$ and the image decoder $D_M$, where a gradient descent method is used to optimally update the parameters of each component in the low-resolution image reconstruction model. The model pre-training process involves several rounds, each of which the above model pre-training process is performed until the training termination conditions are reached to complete the training of the model.

It toned be noted that the loss function to be calculated may be different according to different neural networks.

Referring to FIG. 2, it may be seen that training of the super-resolution model S includes the following scheme.

The super-resolution model S may process the input low-resolution image to obtain a high-resolution image corresponding to the content of the low-resolution image to improve definition of the input low-resolution image. The super-resolution model S consists of basic structures of a neural network such as convolutional layer, fully connected layer, activation layer, pooling layer, and normalization layer. Prior neural networks for super-resolution tasks may be used as the super-resolution models S, or super-resolution model S may also be designed by using the basic structures. The specific structure of the neural network is not required here. The prior super-resolution models S include, but are not limited to, HAT, SwinIR, LTE, etc.

The super-resolution model S internally contains a series of upsampling layers that use low-resolution $x_L$ as input. After upsampling, a reconstructed original-resolution $\hat{x}$ is outputted, where it is desired that the resolution of the reconstructed image $\hat{x}$ is as close as possible to the real original-resolution x.

To train the super-resolution model S, a real low-resolution $x_L$ is used as input and its corresponding original-resolution x is use as supervised data. Through the super-resolution model S, the reconstructed original-resolution $\hat{x}$ is outputted, and a reconstruction loss $L_R(x, \hat{x})$ is calculated, where a reconstruction loss function may use MAE loss ($L_1$ loss), MSE loss ($L_2$ loss), perceptual loss, image similarity loss, or any other loss function that may characterize an image difference. The reconstruction loss function may be optimized to ensure that the reconstructed image outputted from the super-resolution model S has the same content as the real original-resolution image.

It should be noted that the reconstruction original-resolution $\hat{x}$ is in the form of an image.

By optimizing the super-resolution discriminator $D_S$, it is determined whether the input image is a real image or a reconstructed image, so that the reconstructed image outputted from the super-resolution model S is close to the definition of the real image. The super-resolution discriminator $D_S$ may optimize the super-resolution model S, so that the image outputted from the super-resolution model S is closer to the real image. The super-resolution discriminator $D_S$ consists of the basic structures of neural network such as convolutional layer, fully connected layer, activation layer, pooling layer and normalization layer. The structure of a discriminator of a prior generative adversarial network may be used, or the discriminator may be designed by using a basic structure.

The super-resolution discriminator $D_S$ is used for determining whether the input image is a real original-resolution image or a reconstructed original-resolution image, and is a binary classification model, and therefore, it is sufficient to use a commonly used cross-entropy loss function. The cross-entropy loss function $L_S$ is expressed as shown in Equation (1), where $x_i$ denotes an image inputted into a super-resolution discriminator $D_S$, and $y_i$ denotes a label of the image. When the image $x_i$ inputted to the super-resolution discriminator $D_S$ is a real original-resolution image, the $y_i$ is 1; and when the image inputted to the super-resolution discriminator $D_S$ is a reconstructed original-resolution image, the label of this image is $y_i$ is 0. $D_s(x_i)$ denotes an output of the image inputted to the super-resolution discriminator $D_S$, having a value indicating a probability that the input image is a real image. In addition to the cross-entropy loss function for discriminator for classification, other loss functions for classification may also be used.

$$L_S = y_i \log(D_s(x_i)) - (1 - y_i)\log(1 - D_s(x_i)) \qquad \text{Equation (1)}$$

The above reconstruction loss $L_R$ and the cross-entropy loss for the discriminator are calculated, a back propagation process is carried out. Based on the calculated loss function, the gradient is calculated for the parameters of each component in the model, where the parameters of each component in the model are optimally updated using a gradient descent method. It should be noted that the above reconstruction loss $L_R$ is used to optimize only the parameters of the super-resolution model S, and the discriminator loss $L_S$ is used to optimize both parameters of the super-resolution model S and the parameters of the super-resolution discriminator $D_S$. The model pre-training process involves several rounds, each of which the above model pre-training process is performed until the training termination condition is reached to complete the training of the model.

FIG. 3 shows a schematic diagram illustrating data processing for training an interactive video generation model in a real-time interactive video generation method of the present application.

Referring to FIG. 3, it may be seen that a scheme for training an interactive video generation model is described as follows.

The video pre-generation process (i.e., training of the interactive video generation model) comprises generating image latent feature corresponding to an initial frame of the low-resolution images; inputting the image latent feature and interactive information of the corresponding low-resolution image into a transformer of the interactive video generation model to generate target latent feature corresponding to a first frame image; performing image reconstruction on the target latent feature to obtain a reconstructed low-resolution image; and performing super-resolution processing on the reconstructed low-resolution image to obtain a pre-generated first frame image corresponding to a pre-generated video, and thereby generating each of frame images corresponding to the pre-generated video, a resolution of the pre-generated first frame image being the same as a resolution of the video data.

The Transformer encoder-decoder $M_V$ and interactive encoder $E_I$ in FIG. 3 are considered as the transformers in the above.

The interactive video generation model contains components: an interactive information encoder, a Transformer encoder-decoder $M_V$, an image encoder $E_M$, an image decoder $D_M$ and a super-resolution model S. Among them, the image encoder $E_M$, the image decoder $D_M$ and the super-resolution model S have been obtained by the pre-training process described above. Therefore, the process of training the interactive video generation model requires training only the interactive information encoder and the Transformer encoder-decoder $M_V$.

Figure 4:
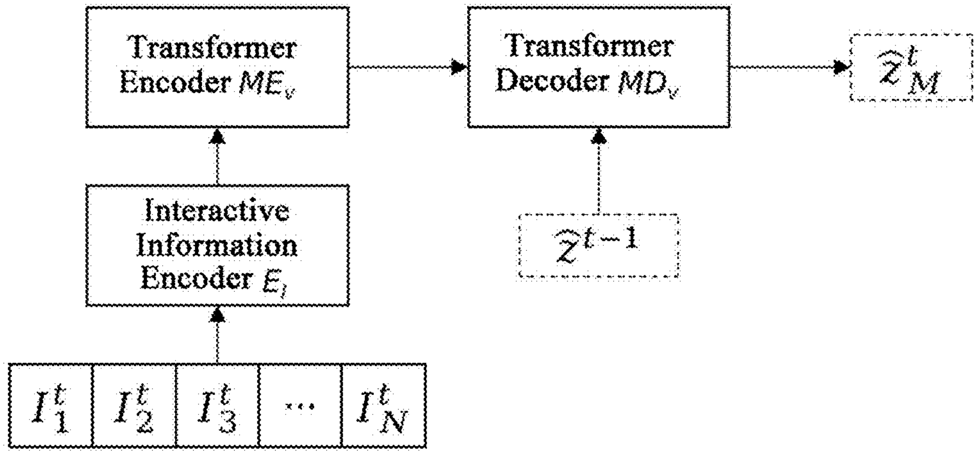
FIG. 4 shows a schematic diagram illustrating data processing by a transformer in the training of an interactive video generation model of the present application.

FIG. 4 shows a schematic diagram illustrating data processing by the transformer in the training of an interactive video generation model of the present application.

Referring to FIG. 4, it may be seen that, further, in some embodiments, the transformer includes an interactive information encoder, a transformer encoder, and a transformer decoder, and thus the step of generating a target latent feature corresponding to the first frame image further comprises inputting the interactive information of the corresponding low-resolution image into the interactive information encoder to obtain an interactive latent feature of the interactive information of the corresponding low-resolution image; and inputting the image latent feature into the transformer decoder, into which the interactive latent feature is transmitted through the transformer encoder, and generating the target latent feature of a corresponding frame of the images based on the interactive latent feature and the image latent feature through the transformer decoder.

In order to avoid confusion, in FIG. 4 the Transformer encoder $ME_v$ is referred to as the transformer Encoder and the Transformer Decoder $MD_v$ is referred to as the transformer decoder.

Exemplary, wherein the interactive information encoder $E_I$ performs network feed-forward and nonlinear transformation on preprocessed interactive information $I^t$ used as an input to obtain the latent feature of the interactive information. The interactive information encoder $E_I$ consists of basic neural network structures such as convolutional layer, fully connected layer, activation layer, pooling layer and normalization layer. In FIG. 3 and FIG. 4, the inputs of the interactive information encoder $E_I$ are all interactive information $I^t$, i.e., the interactive operation information corresponding to a $t^{th}$ frame of the video to be generated. In fact, according to different video generation tasks, the inputs of the interactive information encoder $E_I$ may be in various forms.

The different video tasks described above are classified into (1) offline tasks, where a set of known interactive operation information $I=[I^1, \ldots, I^t, \ldots, I^T]$ is given, and a corresponding video v is generated directly using the known interactive operation information, where T denotes a number of frames of the video to be generated, and t denotes the $t^{th}$ frame of the generated video; and (2) real-time task, where the interactive information of a history frame and a current frame $I=[I^1, \ldots, I^t]$ is given, a video frame $\hat{x}^t$ corresponding to a current moment t is generated, and the generated video frame is output in the form of video stream to realize real-time generation of the video.

For the offline task, since the interactive operation information corresponding to all frames are known, the interactive information encoder $E_I$ may use only the interactive information corresponding to the $t^{th}$ frame, or it may also use the interactive information corresponding to the $t^{th}$ frame and several frames around it, e.g., $[\ldots, I^{t-2}, I^{t-1}, I^t, I^{t+1}, I^{t+2}, \ldots]$. When interactive operation information of multiple frames is used, it is only needed to splice the interactive operation information of multiple frames in the temporal dimension.

For real-time tasks, since only the interactive operation information corresponding to the history frames and the current frame are known, the interactive information encoder $E_I$ may use only the interactive information corresponding to the $t^{th}$ frame, or may also use the interactive information corresponding to the $t^{th}$ frame and several frames around it, e.g., $[\ldots, I^{t-2}, I^{t-1}, I^t]$. When interactive operation information of multiple frames is used, it is only needed to splice the interactive operation information of multiple frames in the temporal dimension The structure of the Transformer encoder-decoder $M_V$ is a commonly used Transformer model, which will not be explained here. The Transformer encoder $ME_v$ encodes the latent feature of the input interactive operation information and uses its internal self-attention mechanism to calculate the importance of each step of timing interactive operation information for generating a corresponding frame. The Transformer decoder $MD_v$ uses output of the encoder $ME_v$ as input and also uses the latent feature $\hat{z}^{t-1}$ of the image generated in the previous frame as input. The generated previous frame image is inputted to the image encoder $E_M$ to obtain the $\hat{z}^{t-1}$. The Transformer decoder $MD_v$ functions to combine the interactive operation information with the information of the generated previous frame image to generate a latent feature $$\hat{z}^t_M$$

of a current frame, which is used for the image decoder $D_M$ to generate a current frame image $$\hat{x}^t_L.$$

Then a definition of the image is improved through the super-resolution model S, and finally a generative frame $\hat{x}^t$ of the current frame image is obtained.

Further, after the generation of a video is completed, the present embodiment further optimizes the scheme as follows: merging all of the generated image frames into the pre-generated video; calculating a reconstruction loss function of the pre-generated video and a real video corresponding to the video data, the reconstruction loss function including an MAE loss, an MSE loss, a perceptual loss and an image similarity loss; constructing a cross-entropy loss function for adjusting the parameters of a video discriminator, the video discriminator being a component in the interactive video generation model for adjusting a definition of the pre-generated video to gradually approach that of the real video; and performing parameter adjustments of each component of the interactive video generation model by the reconstruction loss function and the cross-entropy loss function, where the performing parameter adjustments of each component in the interactive video generation model by the reconstruction loss function and the cross-entropy loss function comprises calculating a gradient for the parameters of each component in the interactive video generation model by the reconstruction loss function and adjusting the parameters of each component in the interactive video generation model by means of gradient descent.

Specifically, in this embodiment, for training the interactive information encoder $E_I$ of the interactive video generation model, the Transformer encoder-decoder $M_V$, the preprocessed interactive operation information is used as input, and a real video segment v corresponding to the interactive operation is used as supervisory information. Through the interactive video generation model, the generated video $\hat{v}$ with the same resolution as the real video segment is outputted, and the reconstruction loss $L_R(v, \hat{v})$ between the generated video and the real video is calculated. The reconstruction loss function may use MAE loss ($L_1$ loss), MSE loss ($L_2$ loss), a perceptual loss, an image similarity loss, or any other loss function that may characterize differences in images. The reconstruction loss function is optimized to ensure that the video generated by the interactive video generation model has the same content as the real video.

Meanwhile, the video discriminator $D_V$ is used to determine whether the input video is a real video or generated video, so that the definition of the video output from the interactive video generation model is close to that of the real video, where the principle and calculation equation of the loss function therefor are the same as that for the super-resolution discriminator $D_S$, and will not be repeated here. A difference between the video discriminator $D_V$ and the super-resolution discriminator $D_S$ lies in that a 2D image is used as the input to the super-resolution discriminator $D_S$, and a 3D video is used as the input to the video discriminator $D_V$. The video discriminator $D_V$ is used for determining whether the input video is a real video or generated video, and is a binary classification model, and so a cross-entropy loss function $L_V$ in the same form as Equation (1) may also be used for optimizing the video discriminator $D_V$.

After the above reconstruction loss $L_R$ and the cross-entropy loss of the discriminator $L_V$ are calculated, the back propagation process is performed. According to the calculated loss function, the gradient is calculated for the parameters of each component in the interactive video generation model, and the parameters of each component in the model are optimally updated using a gradient descent method. It should be noted that the above reconstruction loss $L_R$ is used for optimizing only the interactive information encoder $E_I$ and the Transformer encoder-decoder $M_V$, and the discriminator loss function $L_V$ is used for optimizing parameters of all of the interactive information encoder $E_I$, the Transformer encoder-decoder $M_V$ and the video discriminator $D_V$. Parameters of the image encoder $E_M$, the image decoder $D_M$ and the super-resolution model S are not updated during this training process. The model pre-training process consists of several rounds, each of which the above model pre-training process is performed until the training termination condition is reached to complete the training of the interactive video generation model.

Referring to FIG. 3, it may be seen that a specific scheme for performing image reconstruction on the target latent feature to obtain a reconstructed low-resolution image includes inputting the target latent feature into an image reconstruction decoder, and performing image reconstruction on the target latent feature through the image reconstruction decoder to obtain the reconstructed low-resolution image, where the image reconstruction decoder is a decoder of the low-resolution image reconstruction model, the training of which is completed.

Referring to FIG. 3, it may be seen that a specific scheme of performing super-resolution processing on the reconstructed low-resolution image to obtain a pre-generated first frame image corresponding to the pre-generated video includes inputting the reconstructed low-resolution image into the super-resolution model S, the training of which has been completed, and performing the super-resolution processing on the reconstructed low-resolution image through the super-resolution model S to obtain each of frame images corresponding to the pre-generated video with the same resolution as the video data.

It is to be noted that in order to reflect that the low-resolution image reconstruction model the training of which has been completed is included in the interactive video generation model, the image encoder $E_M$ and the image decoder $D_M$ of FIG. 3 are referred to as an image reconstruction encoder and an image reconstruction decoder.

It is to be noted that when the pre-generated first frame image is generated, the generation of the subsequent image frames is dependent on the data of the previous frame image, by a specific scheme including: when generating a pre-generated $t^{th}$ frame image, inputting a $(t-1)^{th}$ image frame into the image reconstruction encoder to obtain the image latent feature of the $(t-1)^{th}$ image frame; acquiring interactive information corresponding to the $(t-1)^{th}$ image frame and inputting the image latent feature and the interactive information corresponding to the $(t-1)^{th}$ image frame into the transformer of the interactive video generation model to obtain target latent feature corresponding to the $(t-1)^{th}$ image frame; inputting the target latent feature corresponding to the $(t-1)^{th}$ image frame into an image reconstruction decoder, and performing image reconstruction on the target latent feature of the $(t-1)^{th}$ image frame through the image reconstruction decoder to obtain a reconstructed low-resolution image corresponding to the $(t-1)^{th}$ image frame; and inputting the reconstructed low-resolution image corresponding to the $(t-1)^{th}$ image frame into the super-resolution model S, the training of which has been completed, and performing the super-resolution processing on the reconstructed low-resolution image corresponding to the $(t-1)^{th}$ image frame through the super-resolution model S to obtain a pre-generated $(t-1)^{th}$ image frame.

Step S300 may be summarized as the following scheme:

(1) Generating a latent feature $z^0$ of an initial frame, where there are two generation methods: ① In a process of pre-training the image reconstruction model, the latent features of all known images may be obtained, and the latent feature of one of the images which is arbitrarily selected may be used as the $z^0$ (ii) After pre-training the image reconstruction model, a prior distribution of the latent features is known, and the $z^0$ may be sampled from the prior distribution of the latent features.

(2) Inputting the latent feature $z^0$ of the initial frame and the latent feature of the interactive operation information $I^1$ corresponding to the first frame into the Transformer encoder-decoder $M_V$ to obtain the latent feature $$\hat{z}_M^1$$

for reconstructing the first frame image; inputting the latent feature $$\hat{z}_M^1$$

into the image decoder $D_M$ to obtain the reconstructed low-resolution image $$\hat{x}_L^1;$$

and inputting $$\hat{x}_L^1$$

into the super-resolution model S to obtain the generated image generative frame $\hat{x}^1$ with original resolution, the generating of the first frame of the video being completed.

(3) For generating the $t^{th}$ frame image of the video, first inputting the generated previous frame image $\hat{x}^{t-1}$ of the video into the image encoder $E_M$ to obtain the latent encoding $\hat{z}^{t-1}$ of the previous frame image $\hat{x}^{t-1}$; inputting $\hat{z}^{t-1}$ and the latent feature of the interactive operation information $I^t$ corresponding to a current frame into the Transformer encoder-decoder $M_V$ to obtain the latent feature $$\hat{z}_M^t$$

for reconstructing the current frame image; inputting the latent feature $$\hat{z}_M^t$$

into the image decoder $D_M$ to obtain the reconstructed low-resolution image $$\hat{x}_L^1;$$

and inputting the $\hat{x}_L^1$ into the super-resolution model S to obtain the generated image generative frame $\hat{x}^t$ with original resolution, the generating of the $t^{th}$ frame of the video being completed.

(4) Repeating step (3) until a termination condition is reached, where different video generation tasks have different termination conditions. For offline tasks, the termination condition is generally that a number of generated video frames reaches a preset value, then all the generated frames are merged into a video $\hat{v}$. For real-time tasks, the generated video frames are output to a video stream, where the termination condition is generally that the generation process is terminated by a user. A termination condition for the training process is that a number of the generated video frames reaches a number for the video segment for training.

Exemplarily, this embodiment gives the following example of model training:

(1) A game is operated using the keyboard, where a keyboard operation is recorded while a video of the game is recorded, a duration of the video being 30 minutes, a resolution of the video being 512×512 pixels, a frame rate of the video being 30 frames/second, and a frame rate of the keyboard operation recording being 300 frames/second, i.e., each frame image of the video corresponds to 10 frames of the keyboard operation recording.

(2) downsampling the video with an original resolution of 512×512 pixels to a resolution of 256×256 pixels; extracting all frame images from the original video with the resolution of 512×512 pixels, and extracting all frame images from the downsampled video with the resolution of 256×256 pixels; cropping an entire video of 30 minutes into a number of video segments, each of which contains 16 frame images, and between adjacent two of which is a cropping interval of 8 frames, and cropping the keyboard interactive recording data, where each video segment contains 160 frames of interactive data, and each frame image corresponds to 10 frames of interactive data; and performing Gaussian smoothing with a mean of 0 and a variance of 3 is performed on the interactive data corresponding to each frame.

(3) by using the downsampled frame image with a resolution of 256×256 pixels as input data and supervisory data, training an image reconstruction model VQVAE to obtain an image encoder $E_M$ and an image decoder $D_M$, and simultaneously obtain a prior distribution of image latent feature;

(4) training a SwinIR super-resolution model S by using the downsampled frame image with a resolution of 256×256 pixels as input data and the frame image with an original resolution of 512×512 pixels as supervisory data;

(5) extracting the latent feature from the generated previous frame image (the latent feature of the initial frame is obtained by sampling from the prior distribution of the latent features of the images obtained by pre-training of the VQVAE) by using the encoder of VQVAE; inputting the interactive operation information with a duration of 10 corresponding to the current frame into an interactive information encoder to obtain an interactive information latent feature; and inputting the generated image latent feature of the previous frame and the interactive information latent feature into the Transformer encoder-decoder $M_V$ to generate the latent feature of the current frame image; input the latent feature of the current frame image into the image decoder $D_M$ to generate the low-resolution image of the current frame, its resolution being 256×256 pixels; then inputting the low-resolution image into the pre-trained SwinIR super-resolution model S to obtain an image with an original resolution of 512×512 pixels, i.e., the generated current frame image.

(6) Repeating the process of (5) 16 times to obtain the generated video segments; using the generated video segments and the real video segments to calculate the correlation loss function, which is used for optimizing the parameters of the interactive information encoder and the Transformer encoder-decoder $M_V$ until the training is terminated, i.e., the trained interactive video generation model is obtained.

S400, generating an interactive video by using the trained interactive video generation model. Specifically, in this embodiment, in the process of generating the interactive video, the data processing processes of the interactive video generation model includes processes as follows:

① operation processes of the interactive message encoder and Transformer encoder-decoder $M_V$ may be placed in a single process with an input queue as which an output queue of a process ④ is used, and an output queue which is created;

② an operation process of the image decoder $D_M$ may be placed in a process with an input queue as which the output queue of the process ①, and an output queue which is created;

③ an operation process of the super-resolution model S may be placed in a process with an input queue as which the output queue of the process ② is used, and an output queue which is created;

④ an operation process of the image encoder $E_M$ may be placed in a process with an input queue as which the output queue of the process ② is used, and the output queue which is created;

⑤ the final video output process is placed in a process with an input queue as which the output queue of the process ③ is used, where each frame of the generated images is output to a video file or video stream.

The real-time of an inference process of the model may be enhanced by running in parallel.

Exemplarily, this embodiment gives the following example of generating an interactive video:

(1) A set of interactive operation sequences of a known duration are given, where the duration is 3000 frames, a number of frames of a corresponding generated video thereof is 300 frames and a duration of the video is 10 seconds.

(2) sampling a latent feature of an initial frame from a prior distribution of image latent features obtained by pre-training VQVAE; inputting the latent feature of the initial frame and interactive operation information corresponding to the generated first frame image into a Transformer encoder-decoder $M_V$ parameter to obtain latent feature of the first frame image, and then inputting it into the VQVAE decoder to obtain a generated first frame image with low resolution; and inputting the low-resolution image into a SwinIR super-resolution model S to obtain a generated first frame image with the original resolution, which is a first frame image of the generated video.

(3) Starting from a generation of a second frame image, first inputting the generated previous frame image with low resolution into the VQVAE encoder to obtain the latent feature of the previous frame image, and then in combination with the interactive information operation corresponding to a generation of a current frame image, sequentially through the Transformer encoder-decoder $M_V$ parameter, VQVAE decoder, and the SwinIR super-resolution model S, the current frame image with original resolution is generated.

(4) Repeating step (2) until 300 frames of video images are generated, and integrating the generated 300 frames of images into a generated video and output it for saving.

Figure 5:
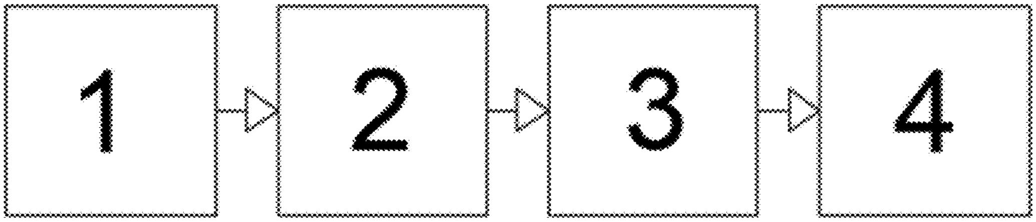
FIG. 5 shows a schematic diagram illustrating a real-time interactive video generation system of the present application.

FIG. 5 shows a schematic diagram illustrating a real-time interactive video generation system of the present application.

Referring to FIG. 5, it may be seen that the present embodiment also provides a real-time interactive video generation system comprising:

a data acquisition module 1 configured to acquire training data including interactive information and video data corresponding to the interactive information, wherein, specifically, in this embodiment, the data acquisition module 1 is used for performing all logical flows for acquiring the training data in the above real-time interactive video generation method;

a data preprocessing module 2 configured to preprocess the training data to obtain target training data, wherein, specifically, in this embodiment, the data preprocessing module 2 is used for realizing all logical flows of preprocessing the training data in the above-described interactive video generation method;

a model training module 3 configured to perform model training including a model pre-training process and a video pre-generation process based on the target training data, where the model pre-training process includes a training of a low-resolution image reconstruction model and a training of a super-resolution model, and the video pre-generation process includes performing a pre-generation of a video based on an interactive video generation model to complete the training of the interactive video generation model, the trained interactive video generation model having the low-resolution image reconstruction model and the super-resolution model, the trainings of which have been completed, wherein, specifically, in this embodiment, the model training module 3 is used for realizing all logical flows for performing model training in the above interactive video generation method; and a video generation module 4 comprising the trained interactive video generation model including the resolution image reconstruction model and the super-resolution model, the trainings of which have been completed, where the video generation module 4 being configured to perform the generation of an interactive video by using the trained interactive video generation model, wherein, specifically, in this embodiment, the video generation module 4 is used for implementing all logical flows for carrying out the generation of the interactive video in the interactive video generation method.

This embodiment has the following advantages.

The real-time interactive information is used as a condition for generation of low-resolution video frame and a super-resolution model is used to improve a size of the generated low-resolution frame image to obtain a clear video frame image of high-resolution. The processes of generating low-resolution video frame images and improving the definition of video frame images by super-resolution may be performed in parallel to output the generated video stream in real time.

What is claimed is:

1. A real-time interactive video generation method comprising:

acquiring training data comprising interactive information and video data corresponding to the interactive information;

preprocessing the training data to obtain target training data;

performing model training comprising a model pre-training process and a video pre-generation process based on the target training data, wherein the model pre-training process comprises a training of a low-resolution image reconstruction model and a training of a super-resolution model, and the video pre-generation process comprises performing a pre-generation of a video based on an interactive video generation model to complete a training of the interactive video generation model, the trained interactive video generation model having the low-resolution image reconstruction model and the super-resolution model, the trainings of which have been completed; and generating an interactive video by using the trained interactive video generation model, wherein the video pre-generation process further comprises:

generating an image latent feature corresponding to an initial frame of the low-resolution images;

inputting the image latent feature and interactive information of the corresponding low-resolution image into a transformer of the interactive video generation model to generate a target latent feature corresponding to a first frame image;

inputting the target latent feature into an image reconstruction decoder, and performing image reconstruction on the target latent feature through the image reconstruction decoder to obtain a reconstructed low-resolution image, wherein the image reconstruction decoder is a decoder of the low-resolution image reconstruction model, the training of which is completed; and inputting the reconstructed low-resolution image into the super-resolution model, the training of which has been completed, and performing the super-resolution processing on the reconstructed low-resolution image through the super-resolution model to obtain the each of the frame images corresponding to the pre-generated video with the same resolution as the video data, wherein low-resolution refers to a resolution that is lower than that of the obtained frame images with the same resolution as the video data.

2. The real-time interactive video generation method according to claim 1, wherein the preprocessing the training data comprises:

downsampling the video data to obtain low-resolution images, wherein a ratio of the downsampling for reducing resolution is determined according to a size of a frame image of the video data;

cropping the low-resolution images to obtain several groups of video segments, each of the video segments comprising T number of frames, and between adjacent two of the video segments being an interval of 2/T number of frames and being an overlap of 2/T number of frames; and recording corresponding interactive information for each of the video segments to obtain the target training data, a frame rate of the interactive information recorded for each of the video segments is not less than a number of frames of the corresponding video segment, and is an integer times of the number of the frames of the corresponding video segment.

3. The real-time interactive video generation method according to claim 2, wherein the recording corresponding interactive information for each of the video segments comprises performing Gaussian smoothing on the corresponding interactive information recorded in the video segment in a temporal dimension.

4. The real-time interactive video generation method according to claim 1, wherein the generating an image latent feature corresponding to an initial frame of the low-resolution images comprises a first method and a second method, the first method comprises acquiring latent features of all of the images in a process of training the low-resolution image reconstruction model, and selecting any one feature among all of the latent features as the image latent feature; and the second method comprises, after the training of the low-resolution image reconstruction model is completed, sampling from a priori distribution of all of the latent features to obtain the image latent feature.

5. The real-time interactive video generation method according to claim 1, wherein the video pre-generation process further comprises:

when generating a pre-generated $t^{th}$ frame image, inputting a $(t-1)^{th}$ image frame into the image reconstruction encoder to obtain an image latent feature of the $(t-1)^{th}$ image frame;

acquiring interactive information corresponding to the $(t-1)^{th}$ image frame and inputting the image latent feature and the interactive information corresponding to the $(t-1)^{th}$ image frame into the transformer of the interactive video generation model to obtain a target latent feature corresponding to the $(t-1)^{th}$ image frame;

inputting the target latent feature corresponding to the $(t-1)^{th}$ image frame into an image reconstruction decoder, and performing image reconstruction on the target latent feature of the $(t-1)^{th}$ image frame through the image reconstruction decoder to obtain a reconstructed low-resolution image corresponding to the $(t-^{1})^{th}$ image frame; and inputting the reconstructed low-resolution image corresponding to the $(t-1)^{th}$ image frame into the super-resolution model, the training of which has been completed, and performing the super-resolution processing on the reconstructed low-resolution image corresponding to the $(t-1)^{th}$ image frame through the super-resolution model to obtain a pre-generated $(t-1)^{th}$ image frame.

6. The real-time interactive video generation method according to claim 1, wherein the transformer comprises an interactive information encoder, a transformer encoder and a transformer decoder, and the video pre-generation process further comprises:

inputting the interactive information of the corresponding low-resolution image into the interactive information encoder to obtain an interactive latent feature of the interactive information of the corresponding low-resolution image; and inputting the image latent feature into the transformer decoder, into which the interactive latent feature is transmitted through the transformer encoder, and generating the target latent feature of a corresponding image frame based on the interactive latent feature and the image latent feature through the transformer decoder.

7. The real-time interactive video generation method according to claim 1, wherein the video pre-generation process further comprises:

merging all of the generated image frames into the pre-generated video;

calculating a reconstruction loss function of the pre-generated video and a real video corresponding to the video data, the reconstruction loss function including MAE loss, MSE loss, perceptual loss and image similarity loss;

constructing a cross-entropy loss function for adjusting the parameters of a video discriminator, the video discriminator being a component in the interactive video generation model for adjusting a definition of the pre-generated video to gradually approach that of the real video; and performing parameter adjustments of respective ones of components in the interactive video generation model by the reconstruction loss function and the cross-entropy loss function.

8. The real-time interactive video generation method according to claim 7, wherein the performing parameter adjustments of respective ones of components in the interactive video generation model by the reconstruction loss function and the cross-entropy loss function comprises calculating a gradient for the parameters of the respective ones of components in the interactive video generation model by the reconstruction loss function and adjusting the parameters of the respective ones of components in the interactive video generation model by means of gradient descent.

* * * * *